United States Patent
Li

(10) Patent No.: US 7,212,963 B2
(45) Date of Patent: May 1, 2007

(54) SYSTEM FOR DISTINGUISHING NAMES IN ASIAN WRITING SYSTEMS

(75) Inventor: Li Yang Li, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 801 days.

(21) Appl. No.: 10/165,988

(22) Filed: Jun. 11, 2002

(65) Prior Publication Data

US 2003/0229634 A1 Dec. 11, 2003

(51) Int. Cl.
*G10L 15/00* (2006.01)
*G06F 17/28* (2006.01)

(52) U.S. Cl. ............................... 704/8; 704/9; 382/185

(58) Field of Classification Search .................... 704/4, 704/7–8, 9; 382/185
See application file for complete search history.

(56) References Cited

U.S. PATENT DOCUMENTS

| | | | |
|---|---|---|---|
| 6,311,152 B1 * | 10/2001 | Bai et al. ........................ | 704/9 |
| 6,694,055 B2 * | 2/2004 | Wu ............................. | 382/185 |
| 2003/0229487 A1 * | 12/2003 | Wang ............................ | 704/4 |
| 2003/0229634 A1 * | 12/2003 | Li ................................. | 707/4 |

OTHER PUBLICATIONS

Chen et al., "Word Identification for Mandarin Chinese Sentences," Proceedings of the Internation Conference on Computational Linguistics, vol. I, pp. 101-107, 1992.*
Nam et al., "A Local Grammar-based Approach to Recognising of Proper Names in Korean Text," CAIR, Proceedings of Fifth Wrokshop on Very Large Corpora, pp. 273-388, 1997.*

* cited by examiner

*Primary Examiner*—Daniel Abebe
(74) *Attorney, Agent, or Firm*—Oliff & Berridge, PLC

(57) ABSTRACT

A system for distinguishing names of persons in Chinese, which includes a computer. The computer includes at least an input, an output, a processor, and a memory and storage arrangement. Data is accessible by the processor, including at least names presently being used in Chinese, and name indicators and non-name indicators that respectively indicate probable presence and non-presence of a name. The system also includes software for performing computer processing including identifying names in Chinese text that has been input to the computer for names corresponding to names in the data for names presently being used in Chinese, name indicators, and non-name indicators. The processing includes comparing the location in the Chinese text of identified name indicators and non-name indicators relative to identified names in the text, and if predefined conditions are met, affirming that that an identified name is being used as a name in the text.

25 Claims, 9 Drawing Sheets

FIG. 2

| EXAMPLES OF SPECIAL CASES OF CHINESE FAMILY NAMES THAT CONSIST OF TWO CHARACTERS ||
|---|---|
| NAME | PRONUNCIATION |
| 上官 | SHANGGUAN |
| 诸葛 | ZHUGE |
| 司马 | SIMA |

FIG. 3

| EXAMPLES OF CHINESE FAMILY NAMES HAVING MEANING ONLY AS A NAME ||
|---|---|
| NAME | PRONUNCIATION |
| 李 | LI |
| 刘 | LIU |
| 赵 | ZHAO |
| 吴 | WU |
| 孙 | SUN |

FIG. 4

| \multicolumn{3}{c}{EXAMPLES OF CHINESE NAMES ALSO HAVING MEANING WHEN USED AS OTHER THAN A NAME} |
|---|---|---|
| NAME | PRONUNCIATION | MEANING |
| 金 | JIN | GOLD |
| 柳 | LIU | WILLOW |
| 钱 | QIAN | MONEY |
| 白 | BAI | WHITE |
| 王 | WANG | KING |
| 江 | JIANG | RIVER |
| 朱 | ZHU | RED |
| 雷 | LEI | LIGHTNING |
| 胡 | HU | FOREIGN |

FIG. 5A

EXAMPLE CHINESE PHRASES OR SENTENCES

| EXAMPLE WITH WORD-BY-WORD TRANSLATION | ENGLISH TRANSLATION |
|---|---|
| JIANG ZEMIN   PRESIDENT<br>江 泽 民        主 席 | JIANG ZEMIN, PRESIDENT |
| CHINESE   PRESIDENT   JIANG ZEMIN<br>中国国家主席              江泽民 | THE CHINESE PRESIDENT, JIANG ZEMIN |
| MY FATHER   DENG XIAOPING<br>我的父亲      邓 小 平 | MY FATHER DENG XIAOPING |
| CHINESE PRESIDENT JIANG ZEMIN TO EUROPE VISIT<br>中国国家主席          江泽民      赴 欧洲      访问。 | THE CHINESE PRESIDENT JIANG ZEMIN GOES TO VISIT EUROPE. |
| NATIONAL FOOTBALL TEAM MEMBER  LI TIE  FOR FANS  SIGNS<br>国家队队员                            李铁    为  球迷    签 名。 | NATIONAL FOOTBALL TEAM MEMBER LI TIE SIGNS FOR HIS FANS. |
| ZHU RONGJI PRIME MINISTER  GIVES   SPEECH<br>朱镕基      总理              发表      讲话。 | PRIME MINISTER ZHU RONGJI GIVES A SPEECH. |
| SECRETARY TO WANG SHI BOARD CHAIRMAN REPORTS BUSINESS<br>秘书给  王石  董事长              汇报      工作。 | A SECRETARY REPORTS THE BUSINESS TO THE BOARD CHAIRMAN WANG SHI. |

FIG. 5B

| EXAMPLE CHINESE PHRASES OR SENTENCES | |
|---|---|
| EXAMPLE WITH WORD-BY-WORD TRANSLATION | ENGLISH TRANSLATION |
| WANG ANSHI WAS FAMOUS POET<br>王安石 是 著名 诗人。 | WANG ANSHI WAS A FAMOUS POET. |
| LEI FENG'S STORY<br>雷锋 的 故事。 | THE STORY OF LEI FENG. |
| LI CHUNBO'S SONG IS VERY FAIR SOUNDING<br>李春波 的 歌 很 好 听。 | THE SONG OF LI CHUNBO IS VERY FAIR-SOUNDING. |
| LIANG SHANBO AND ZHU YINGTAI<br>梁山伯 与 祝英台 | LIANG SHANBO AND ZHU YINGTAI. |
| JIANG TAO IS VERY CLEVER<br>江涛 非常 聪明。 | JIANG TAO IS VERY CLEVER. |
| HU SHENG IS FAMOUS AUTHOR<br>胡绳 是 著名的 文学家。 | HU SHENG IS A FAMOUS AUTHOR. |

FIG. 6

EXAMPLE STATUS TERMS IN CHINESE

| STATUS TERMS THAT MAY APPEAR BEFORE OF AFTER A NAME | | STATUS TERMS THAT MAY APPEAR ONLY BEFORE A NAME | |
|---|---|---|---|
| TERMS | TRANSLATION | TERMS | TRANSLATION |
| 主席 | PRESIDENT OR CHAIRMAN | 民警 | POLICEMAN |
| 总理 | PRIME MINISTER | 学生 | STUDENT |
| 队员 | MEMBER | 球星 | FOOTBALL STAR |
| | | 父亲 | FATHER |
| | | 母亲 | MOTHER |

FIG. 7

| GRAMMATICAL DESCRIPTION | EXAMPLES |
|---|---|
| CONJUNCTIVE TERMS | 与 和<br>AND AND |
| PREPOSITIONAL TERMS | 对 向 给 为<br>TO TO BY OR TO FOR |
| ASPECT MARKERS | 着 了<br>(P ST TENSE) |
| ADVERBS | 很 特<br>VERY MUCH |
| QUANTITIES | 一 百<br>ONE 100 |
| VERBS | 吃 喝 看 听 去 走 跑<br>EAT DRINK SEE LISTEN GO WALK RUN |
| POSSESSIVE INDICATORS | 的<br>OF |

SYSTEM FOR DISTINGUISHING NAMES IN ASIAN WRITING SYSTEMS

CROSS-REFERENCE TO RELATED APPLICATIONS

Not applicable.

STATEMENT REGARDING FEDERALLY SPONSORED RESEARCH DEVELOPMENT

Not applicable

Field of the Invention

The present invention relates generally to systems for distinguishing names in text from other words, and more particularly to systems for distinguishing names in text in Asian writing systems from other words.

BACKGROUND OF THE INVENTION

Asian writing systems, such as that used in China, are substantially different from writing systems developed in other parts of the world. In writing systems for most Western languages, characters are employed to represent sounds in spoken words. With relatively few characters, the characters can be arranged in many different combinations to represent the thousands of sound combinations used in speech.

In contrast, in the Chinese writing system, characters typically do not represent individual sounds in spoken words. Rather, the character represents an idea or concept. Consequently in the Chinese writing system, thousands of different characters have been developed corresponding to thousands of different concepts. In general, the Chinese writing seems to be much more complex than that used in most Western countries because a much greater number of characters form the Chinese writing system.

Further complicating the Chinese writing system is that the characters are combined into sentences with essentially no variation in spacing between characters. While a single Chinese character may correspond to an entire word, often two or more characters together correspond to a word. Hence, it can be difficult to distinguish individual words from one another in a sentence written in Chinese because there is little to indicate where one word ends and another begins, i.e., there is no spacing between words. Punctuation can be relied on as delimiter between words, such as periods or commas, as well as words customarily written in English and appearing in a sentence otherwise formed of Chinese characters. Frequently, though, there will be no delimiter between one word and the next within a sentence written in Chinese.

In this respect, Chinese can be more problematic than Japanese. The Japanese system initially seems to appear more complex than Chinese, in that the Japanese writing system employs three character sets: (1) kanji; (2) hiragana; and (3) katakana. In addition, some words are commonly written in English in Japanese.

In Japanese, the kanji characters are based in substantial part on the Chinese writing system. Specifically, many kanji characters used in the Japanese writing system are similar or substantially identical to Chinese characters for representing corresponding concepts, although pronunciation is often completely different. In Japanese therefore, as in Chinese, such characters typically do not represent individual sounds in spoken words. Hence, the Japanese writing system is complex in that it is formed of thousands of different characters.

In written Japanese, as in Chinese, sentences have essentially no variation in spacing between characters forming the sentence, i.e., there is no spacing between words. Notwithstanding, it is usually easier to distinguish one word from another in a written Japanese sentence because of the other two Japanese character sets, hiragana and katakana.

Hiragana and katakana are both phonetic alphabets. Specially, both employ a set of characters representing sounds in spoken words. Katakana is generally used in the Japanese writing system to spell words from foreign languages used in Japanese. Hiragana is used for, among other things, words of Japanese origin for which there is no kanji character, as subject or object markers, showing location such as at, in, by and etc, for showing possessive states, and indicating tenses. In a written Japanese sentence, hiragana and/or katakana characters often separate words in kanji characters from one another, thereby making it easier to distinguish one word from another relative to a comparable sentence in Chinese.

For example, to write the child's dog in Japanese, a hiragana character indicating possession will appear between the kanji characters for child and dog. Thus, relative to Chinese, it is easier in Japanese to distinguish words from one another due to characters from the Japanese phonetic character sets appearing in sentences in the Japanese writing system.

Difficulties have been encountered in developing information systems capable of accurately processing articles or text in Asian writing systems, such as Chinese, Japanese, Korean, and etc. While difficulties may not be as problematic with some Asian writing systems, such as Japanese, difficulties have arisen in general with such Asian writing systems.

One difficulty in particular has been in developing an information processing system capable of accurately distinguishing names of persons or organizations in Chinese from surrounding textual material. Such processing would be useful for instance, for searching articles for keywords or pertinent phrases to locate articles relevant to a particular subject and/or for indexing articles for future document retrieval. For example, someone may wish to locate and/or index articles concerning a famous Chinese person. In addition, such processing would be useful for more accurate computer translation of Asian text into another language, such as English.

In Chinese and other languages, a person's name may have meaning when used in a context other than as a personal name. In English for instance, "king" is a relatively common surname and also a noun meaning the head of state in countries with some form of monarchial government. Similarly, in Chinese the word "wang" (also commonly written "wong" in English) is a common surname, but it also means king or emperor. Accurate translation requires a system capable of reliably distinguishing when such a word is used as a personal name or as a noun meaning something else.

BRIEF SUMMARY OF THE INVENTION

The present invention provides a system for distinguishing names of persons in Chinese text. The system includes a computer for receiving Chinese text in electronic format. The computer has at least an input, an output for outputting results, a processor for processing instructions and data; and a memory and storage arrangement for storing instructions and data.

The system further includes data or a database accessible by the processor, which data/database includes at least names presently being used in Chinese, name indicators used in Chinese text that indicate probable presence of a name and non-name indicators that indicate a word probably cannot be a name in Chinese text.

The system additionally includes software installed on the computer. The software when performed by the computer causes the processor to perform processing including identifying names in Chinese text that has been input to the computer for names corresponding to names in the data for names presently being used in Chinese. The processing also identifies name indicators and non-name indicators in the inputted Chinese text corresponding to the data.

Then the processing compares the location in the Chinese text of identified name indicators and non-name indicators relative to identified names in the text. If predefined conditions are met in the comparison, the processing affirms that an identified name is being used as a name in the text. The processing further outputs the results.

In one aspect, the data includes family names and given names. In this regard, the predefined conditions require a determination that a family name is immediately followed in the text by a given name. In a further aspect, the predefined conditions include a plurality of rules applied in sequential order. In a still further aspect, the data includes single-character given names, the first character of two-character given names, and the second character of two-character given names.

In another aspect, the data includes family names of at least two types, a first type being a family name that has meaning only when used as a name, and a second type being a family name that also has meaning when used in a context as other than as a name. Moreover, the data indicates the type for each family name. If a name-indicator is not present in the text corresponding to an identified name of the second type, and if predefined conditions are met, the processing notes this identified name as requiring validation before the name can be affirmed as being used as a name in the text.

In other aspects, the data includes name indicators of at least two types, a first type wherein the name must precede the probable presence of a name in text for which the name indicator is indicating the probable presence thereof, and a second type for which the name indicator may either precede or follow the probable presence of a name in text for which the name indicator indicates the probable presence thereof. The data/database also indicates the type for each name indicator, and the predefined conditions take into account the location of an identified name relative to the type of an identified name-indicator. In yet other aspects, the name indicators include terms that signify the status of a person.

In aspects concerning a method or process, the present invention provides a process for distinguishing names of persons in Chinese text. The initial step of the process step includes establishing data or a database corresponding to family names currently in use in Chinese, name indicators used in Chinese text that indicate the probable presence of a name; and non-name indicators that indicate a word probably cannot be a name. Based on the data/database established, the process identifies in Chinese text based on the data, family names, name indicators and non-name indicators. The process further compares the location in the Chinese text of identified name indicators and non-name indicators relative to identified names in the text. If predefined conditions are met, the process affirms that that an identified name is being used as a name in the text.

In aspects pertaining to a product, the present invention provides a product for distinguishing names in Chinese text using a computer. The product includes a recording medium having computer readable data/database and program logic recorded thereon. The data includes family names currently in use in Chinese, name indicators used in Chinese text that indicate the probable presence of a name; and non-name indicators that indicate a word probably cannot be a name.

The program logic when executed by a computer, causes the computer to perform processing. The computer processing includes identifying names in a Chinese phrase or sentence that has been input to the computer for names corresponding to names in the data for names presently being used in Chinese. The computer processing further identifies name indicators and non-name indicators in the inputted Chinese text corresponding to the data. In addition, the computer processing compares the location in the Chinese text of identified name indicators and non-name indicators relative to identified names in the phrase or sentence. If predefined conditions are met, the computer processing affirms that that an identified name is being used as a name in the phrase or sentence. Also, the processing outputs results.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2 illustrates a table showing examples special cases of Chinese family names that consist of only two characters;

FIG. 3 illustrates a table showing examples of family names in China that have meaning only as a name;

FIG. 4 illustrates a table showing examples of family names in China that also have meaning when used as other than as a family name;

FIGS. 5A and 5B illustrate a table showing example Chinese phrases or sentences;

FIG. 6 illustrates a table showing examples of status terms in Chinese;

FIG. 7 illustrates a table showing examples of grammatical terms that in most cases do not form part of a name in Chinese.

DETAILED DESCRIPTION OF THE PREFERRED EMBODIMENTS

Figure 1:
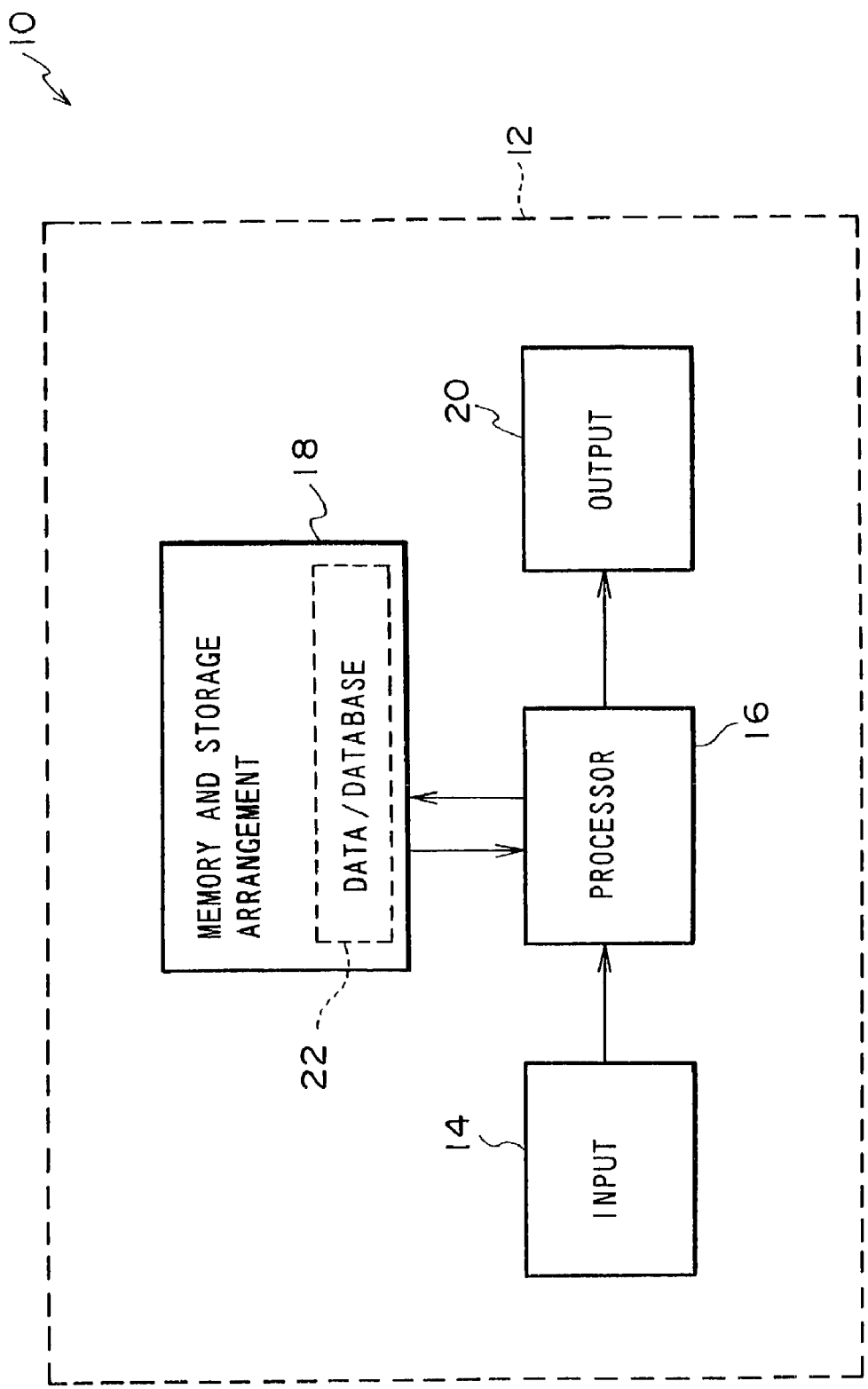
FIG. 1 schematically illustrates a system in accordance with a preferred embodiment of the present invention.

FIG. 1 schematically illustrates a preferred embodiment of a system 10 in accordance with the present invention. The system 10 is preferably implemented on a computer 12 having a commercially available operating system. During development, a preferred embodiment of the system was implemented on computers having LINUX and WINDOWS operating systems, but other operating systems could be used as well, such as UNIX or operating systems available from APPLE COMPUTER. The computer 12 includes an input 14 for inputting information, a processor 16 for processing instructions and data, and a memory and storage arrangement 18 for storing instructions and data, and an output 20.

The processor 16 may be a central processing unit (CPU) or perhaps a plurality of processors in a computer having a multiple processor arrangement. The memory and storage arrangement 18 would include items such as RAM, ROM, disk drives, such as hard disks and/or floppy disks, electro-optical drives, such as drives for CDs and/or DVDs, and other media for data storage, such as flash memory cards, for example, types such as COMPACT FLASH, SD ("SECURE DIGITAL"), MMC ("MULTIMEDIA CARD"), SMART MEDIA, and etc. Computer program logic, i.e., software is installed on the computer 12, and stored in the memory and storage arrangement for execution by the processor 16.

Inputting information into the computer 12 includes inputting text in electronic format input into the system 10 through the memory and storage arrangement 18. For example, such as text stored in computer readable format on a floppy disk or other media and read into the system 10 via a disk drive. Alternatively, the text could be downloaded into the system 10 through an Internet connection via a modem or network connection. In addition, if the computer operating system is adapted for keyboard entry of Chinese text, the text could be typed into the system using a keyboard via the computer input 14 or other manual input arrangement. Further, the text could be in printed form and scanned into electronic format for input into the computer 12. Also, speech recognition software could be used for translating spoken or audio Chinese into text format. Through any of the foregoing techniques and/or other presently available technologies, Chinese text in electronic format is input into the computer 12 for processing in accordance with the system 10.

The system 10 preferably works with presently available word segmentation and part-of-speech tagging software. In particular, prior to processing Chinese text, the text is segmented into separate words by word-segmentation software. In addition, the word-segmentation software preferably also notes or tags words in accordance with a lexicon as to which parts-of-speech the words correspond to, such as noun, verb, adjective, adverb, preposition, conjunction, and so forth. After the text has been segmented, the system 10 is employed to identify names of persons in the text.

In processing Chinese text, the system 10 relies upon some characteristic features to which most Chinese names conform. One of these characteristic features is that in modern Chinese society, only a few hundred family names are in current use. Throughout the long history of China, probably thousands of family names have been used. Notwithstanding, as of the present date, less than a thousand family names are in use, and it is likely, that no more than 500 family names are currently being used.

Moreover most family names in China consist of a single Chinese character, except for a few special cases that consist of two Chinese characters. FIGS. 3 and 4 shows some examples of Chinese family names consisting of only a single character. FIG. 2 shows examples of some of the few special cases of Chinese family names that consist of two characters.

During development of the system, 440 different single-character family names were extracted from a sample of 24,720 modern Chinese names. These 440 different family names were used to establish data 22 for the system 10 to use in distinguishing Chinese names appearing in articles or other information written in Chinese, from surrounding words. For ease and speed in search and retrieval, the data was arranged into a database 22. Preferably the data or database 22 would be stored on a hard disk in the memory and storage arrangement 18. However, the database 22 could reside on a CD other media.

As mentioned above, most Chinese family names consist of a single character, except for a few special cases that consist of two characters. Since most Chinese family names consist of only a single-character, initial development efforts focused on establishing data for identifying family names in China that consisted of a single character. Notwithstanding, a preferred embodiment of the system will include processing steps or rules and/or data for also identifying the special exceptions for two-character family names.

Of the names in the database 22, some of the names have meaning when used as ordinary words, i.e., when not used as a name. Others have meaning only as a person's name. For example, gold, willow, white, and money all may be used as names for a person, but these words have meanings as well when not used as name. FIG. 3 shows some examples of family names from the database 22 that have meaning only as a person's name. FIG. 4 shows examples having meaning both as a family name, and when not used as a name. Family names having meaning only as a name is another characteristic feature of Chinese naming conventions that the system relies upon.

More particularly, if the system 10 identifies a word in a sentence corresponding to a family name in the database 22, the system 10 tags or notes the word in accordance with the data as to whether the word can only be used as a family name, or if the word can also have meaning when used as other than as a family name. For instance if the system identifies the word for gold in a sentence, the system notes or tags this word as of the type that can possibly be a family name, but also as a word that can have meaning as other than as a family name. Thereafter, the system searches for other indicators in the sentence to attempt to determine whether the noted or tagged word in question is indeed a name, or is being used in a context in the sentence as other than as a family name, such as to mean a precious metal.

One type of indicator is words or terms signifying status, such as chief, prime minister, student, father, mother, and etc. It may be a term consisting of a single word indicating status, such as chief, or a term of two or more words together, such as prime minister. Terms signifying status appearing before or after a word that could be a name are additionally tagged or noted for determining whether the word noted as possibly being a family name is indeed a family name, and that the word in question is not being used in a context in the sentence other than as a name. Status terms are name indicators that indicate the probable presence of a name if certain conditions are met.

Terms signifying status fall into at least two categories. One of the categories is status terms that can only precede a name, such as the word for indicating fatherhood. That is, is the word for father in Chinese, precedes the father's name.

The other category is status terms that may appear either before or after the name for which the word is indicating status. For example, the term for president in Chinese may appear before or after the president's name, depending on the context. An example sentence using the term president is shown in FIG. 5A.

In particular, FIG. 5A shows the name of the head of state in China as of the time of this writing, together with the word indicating the status of presidency. More particularly, as of the present date, Jiang Zemin is the Chinese head of state. In Chinese however, names are written family name first, and given name last. The Chinese head of state, Jiang Zemin is therefore President Jiang, not President Zemin. As shown in FIG. 4, the word indicating the status of presidency in Chinese may appear before or after the name of the president.

FIG. 6 illustrates examples status terms for each of the two categories. In particular, the first column in the table in FIG. 6, lists some examples of words indicating status that may appear in Chinese before or after the name of the person for which the word is indicating status, such as the words for chairman, prime minister, president, and etc. The second column of the table in FIG. 6 lists some examples of terms indicating status that in Chinese can only precede the name of the person for which the words are indicating status, such as the words for policeman, student, football star, father, mother, and etc.

The system 10 relies upon status terms as an additional indicator as to whether a name noted as possibly being a family name is indeed being used as a name, or is being used in a context having a meaning other than as a family name. Returning to the example of FIG. 5A, the name of the Chinese head of state is Jiang Zemin, where Jiang is the president's surname or family name, and Zemin is the president's first name or given name.

Jiang is used as a family name in China, but it can also be used to mean a river. If the system 10 located this word in a sentence, it would note this word as possibly being a family name and would further look for status terms. In particular, the system would look for status terms for additional indicators as to whether it is being used as a family name, or whether it is being used in another context, such as to indicate a river.

FIG. 5A additionally lists as an example the sentence: "The Chinese president Jiang Zemin goes to visit Europe." The system 10 would search the sentence for words matching family names listed in the database 22. Based on the database entries, it would locate Jiang, and tag or note Jiang as being a family name of the type that also has meaning when used in a context other than as a name.

At this juncture, there is thus no determination as of yet as to whether Jiang is a family name. In this situation, the system 10 thus looks for terms showing status for further indicators as to whether Jiang is a family name. In the example, the system 10 would locate or identify the word for president appearing before Jiang, an additional indicator that Jiang is indeed being used a family name in this sentence.

Notwithstanding, the word president is a status term falling into the category in the left column of the table in FIG. 6. Specifically, president is a status term in Chinese that may appear before or after a name. Therefore, the system 10 tags or notes that the word president may be indicating status for the preceding word, not the following word, which is Jiang.

At this stage, the system 10 considers if other indicators are additionally present further signifying whether Jiang is being used as a family name. For example, the system 10 determines whether a character or characters is present, which could be a first or given name. As discussed above, in Chinese a person's family name is listed first and then the given name. Moreover, there are no middle names in Chinese. If a character or characters follow Jiang, which could be a given name, then this is a further indication that Jiang is being used as a family name.

Like family names, given names in modern China may consist of only one or two characters. However, two-character given names are more common and are not limited to a few exceptions as with family names. In addition, the number of different given names presently in use is much greater than that for family names. Compared to family names, it is difficult to establish a substantially complete database of given names presently in use in China.

From the sample of 24,720 Chinese names, 1,040 different one-character given names were extracted. In addition, 1,246 characters were extracted that formed the first character of a two-character given name. In addition, 1,136 characters were extracted that formed the second character of a two-character given name. All of these characters were used to form a database or dictionary for distinguishing given names from surrounding words in articles or information written in Chinese.

Returning to the example sentence in FIG. 5A of the Chinese president going to visit Europe, the system 10 has noted the word, Jiang, which is possibly being used as a family name. In addition, the system 10 has identified the status word, president, in the example sentence preceding the possible family name word, Jiang. Nevertheless, the system 10 has noted that the status term president, falls into a category, which may precede or follow the name of a person for which the word is indicating presidential status. Hence, there is still uncertainty as to whether Jiang is being used as a family name despite identification of the status term president preceding Jiang.

Rules 1 through 3 each require a family name to be immediately followed by a status word or term. In this regard, Rules 1 through 3 each presume that the status term is indicating status for the name of a person that the status word precedes in the sentence. Rules 1 through 3 are applied even if the status word is of the type that may follow the person's name for which status is being indicated. Further, Rules 1 through 3 are applied even if the family name identified in the sentence is of the type that has meaning in modern Chinese only as a family name.

If all of the conditions of one of the rules are met, the system 10 affirms that the noted possible family name is indeed being used as a name in this context. Each rule requires indications that a given name follows the noted possible family name in the sentence. Rule 3 checks for the possibility that a single-character given name follows the noted family name. Rules 1 and 2 both check for the possibility that a two-character given name follows the noted family name. Consequently both Rules 1 and 2 require the presence of two characters following the noted possible family name, as a two-character given name must consist of a pair of characters.

Rule 1 requires, among other things, that the second character of the pair correspond to one of the characters in the database 22 that form the second character of a two-character given name. Rule 2 requires, among other things, that the first character of the pair correspond to one of the characters in the database 22 that forms the first character of a two-character given name.

The rules are preferably performed in sequential order, i.e., Rule 1, then Rule 2, followed by Rule 3, and so on. Other orders are possible, but for these rules the order of application described herein is believed to generally provide the best results.

Continuing with the example in FIG. 5A of the Chinese president going on a visit to Europe, the system 10 has noted a possible family name. Moreover, the noted possible family name is preceded by a status term, which the system 10 has noted of being in the category for which the status term may precede or follow the name of a person for which status is indicated. The system 10 therefore first applies Rule 1 to determine if all of the conditions of this rule are met.

As mentioned earlier, the system 10 applies Rule 1 to check for the possibility that a two-character given name is present immediately following the noted family name. One of the conditions of Rule 1 is that at least two characters must follow the noted possible family name as a two-character given name requires the presence of at least a pair of characters. This condition is met as a total of five characters follow the noted possible family name in the example sentence in FIG. 5A of going to Europe.

Another condition of Rule 1 is that the second character of the pair of characters following the noted possible family name must correspond to one of the characters in the database 22 that can be the second character of a two-character given name. Moreover, the second character must not correspond to a conjunction in Chinese.

A name in a Chinese sentence will often be preceded or followed by a conjunctive term such as characters meaning and, with, to, for, and etc. In most cases, a word that is a conjunctive term would not form part of a given name in China. If the second character is a conjunctive term, a condition of the Rule 1 is not met. In FIG. 7, a table is shown illustrating Chinese characters that correspond to conjunctive terms. A conjunctive term is thus a non-name indicator, i.e., when present it tends to indicate that a particular word is probably not a name, or at least probably not being used as name in this context.

Further, the second character must not be an adverb, such as a character indicating "very much," as it would be unusual for a name in Chinese to have this kind of character. As with a conjunctive term, the presence of an adverb is a non-name indicator. The table in FIG. 7 illustrates some examples of Chinese characters that correspond to adverbs. The second character of the pair of characters following the noted possible family name, meets these conditions. That is, it corresponds to a character in the database 22 that can form the second character of a two-character given name in China, and it does not correspond to a character for a conjunctive term or an adverb.

With respect to the first character of the pair of characters following the noted possible family name, an additional condition of Rule 1 is that the first character must neither be a conjunctive nor a prepositional term. Prepositional terms include characters meaning to and by in Chinese. In most cases, a word that is a conjunctive or prepositional term would not form part of a given name in China. If the first character corresponds to a conjunctive or prepositional term, a condition of Rule 1 is not met. In FIG. 7, the table also illustrates some Chinese characters corresponding to prepositional terms.

A further condition pertaining to the first character of the pair of characters following the noted possible family name is that it must not be a verb that cannot form part of a name in Chinese. More particularly, some verbs such as beat or eat for example, cannot form part of a name, but in a sentence in Chinese often immediately follow a name. The table in FIG. 7 illustrates Chinese characters for some verbs that cannot form part of a name in Chinese. Similar to conjunctive and preposition terms and adverbs, these kinds of verbs are non-name indicators that tend to indicate that a word is probably not being used as the name of a person, or at least not as a name in this context.

In the present example, the first character of the first two characters following the noted possible family name is neither a conjunctive nor prepositional term, nor a verb in Chinese that cannot form part of a name. Moreover, the second character of the first two characters following the noted possible family name corresponds to a character in the database 22 that can form the second character of a two-character given name. Since all of the conditions of Rule 1 are satisfied, the system 10 affirms, as all of the conditions of Rule 1 are met, that the noted possible family name is indeed being used a family name together with the immediately following two characters, which are being used as a two-character given name.

The system 10 thereafter applies Rule 2. The remaining rules are applied for, among other things, where more than one family name is present in a phrase or sentence. Perhaps the system 10 is able to distinguish one of the family names based on Rule 1, but later rules in the sequence are necessary for distinguishing the remaining family name in the sentence or phrase.

For discussion purposes assume that not all of the conditions of Rule 1 were satisfied. For instance, perhaps the condition is not satisfied in Rule 1 with respect to the second character of the first two characters following the noted possible family name. That is, perhaps the second character of these first two characters does not correspond to a character in the database 22 that forms the second character of a two-character given name.

Rule 2 imposes, among other things, a condition on the first character of the first two characters following the noted possible family name. Namely, the first character of these two characters must correspond to one of the characters in the database 22 that forms the first character of a two-character given name. In addition, Rule 2 imposes requirements on the second character of the two characters. Specifically, the second character must not be a character that is a conjunctive or prepositional term or a verb that cannot form part of a name in Chinese.

In addition, the second character must not be an aspect marker or an adverb. An aspect marker is a character used in Chinese to indicate past tense. The table in FIG. 7 also illustrates some examples of Chinese characters that correspond to aspect markers. Further, the second character must not be an indicator of punctuation, such as a comma, period, and etc.

There is no condition in Rule 2 that the second character must correspond to one of the characters in the database 22 that forms the second character of a given name in China. This has been found advantageous in identifying some special names or cases of two-character given names, and is one of the reasons that the rules are preferably applied in the order described herein.

For discussion in connection with Rule 3, FIG. 5A illustrates another example sentence stating: "National football team member Li Tie signs for his fans." With this sentence, the system 10 would identify the word Li as being a word that is used as a family name. In addition, the system 10 would tag or note Li as being of the type that does not have any meaning in modern Chinese as other than as a name.

The system 10 would also identify the word "member" as a term used for signifying status when used in conjunction with a person's name, which precedes Li in the sentence. The system 10 would further recognize that the term member falls into the category indicated by the left column in the table of FIG. 6. That is, the term member may appear either before or after the name of the person for which the word is indicating status. Hence, the system 10 tags or notes that the term member may be indicating status for the preceding word, not the following word, which is Li.

The system 10 uses Rules 1 and 2 to both check for the possibility that the noted possible family name, Li, is followed by a two-character given name. Hence, both Rules 1 and 2 require that at least two characters in the sentence follow the noted possible family name, which is satisfied. Namely, a total of six characters follow the noted possible family name, before the sentence terminates with a period.

However, all of the conditions of Rule 1 are not satisfied. Rule 1 requires, among other things, that the second character of the first two characters following the noted possible family name, correspond to a character in the database 22 that can form the second character of a two-character given name. In this situation, there is no correspondence. The second character of the first two characters following the noted possible family name is a preposition meaning "for" and does not form part of a given name in Chinese.

Neither are all of the conditions of Rule 2 satisfied. Rule 2 requires, among other things, that the second character of the first two characters following the noted possible family name, must not be a prepositional term (FIG. 7 illustrates some Chinese characters that correspond to prepositional terms). As discussed in the preceding paragraph, the second character of the first two characters following the noted possible family name is a preposition meaning "for." Thus, at least this condition of Rule 2 is not met. Therefore, the system 10 cannot affirm whether the noted possible family name is indeed being used as name based on either of Rules 1 or 2.

The system 10 next applies Rule 3. As mentioned previously, the system 10 uses Rule 3 to check for the possibility that a single-character given name follows the noted possible Chinese name. Rule 3 imposes the condition that the character immediately following the noted possible family name must not be a possessive indicator, a conjunctive term or a verb that cannot form part of a name in Chinese. A possessive indicator indicates that something is possessed by, or of something else. The table in FIG. 7 also illustrates an example of a Chinese character corresponding to a possessive indicator.

Rule 3 further imposes the condition that the character following the noted possible family name must be a conjunctive term or a verb that cannot form part of a name in Chinese. In addition, the second character following the noted possible family name must be a conjunctive or prepositional term or punctuation. Conjunctive and/or prepositional terms and punctuation cannot form part of a name, and therefore often mark the right boundary of name in a sentence or phrase in Chinese. If all of the conditions of Rule 3 are met, the system 10 determines that the noted possible family name is indeed a family name, and that it is followed by a one-character given name.

Rules 1 through 3 each require that a family name be preceded immediately by a status term in a sentence or phrase in Chinese. The family name need only correspond to one of the words in the database 22 that are used for family names in modern Chinese. That is, the family name may be of a type that has meaning only as a family name, or of the type that can also have meaning in contexts other than as a name. In addition, the status term need only immediately precede the family name in the sentence for this condition in each of the three rules to be met. That is, the status term may of the type that can only precede the name for which it is indicating status, or the type of status term that may precede or follow the name for which status is being indicated.

A condition of each of Rules 4 through 6 is that a status term must follow a family name in a sentence. In Rules 4–6, as with Rules 1–3, the family name need only correspond to one of the words in the database 22 that are used for family names in modern Chinese. That is, the family name may be of a type that has meaning only as a family name, or of the type that can also have meaning in contexts other than as a name. However, the status term must be of a type that can either follow or precede the name for which status is being indicated. Further, the status term cannot be adjacent the family name.

FIG. 5A illustrates the example sentence: "Prime Minister Zhu Rongi gives a speech." In this sentence, the system 10 would identify Zhu as being a word that can be used as a family name, but can also be used to mean the color red. In addition, the system 10 would note the status term prime minister as being of the type that may appear before or after the name for which status is being indicated in the sentence. In addition, the status term does not immediately follow the family name. In particular, the status term is separated by the characters for the given name Rongi from the family name Zhu.

Rules 4 and 5 both check for the possibility that a two-character given name follows the noted family name. For this reason, both Rules 4 and 5 impose the condition that the status term must be separated from the family name by exactly two characters. Since Rongi separates the status words from the family name and Rongi consists of two characters, this condition is met for both Rules 4 and 5.

Rule 4 additionally imposes the condition that the first character following the family name, must correspond to a character in the database 22 that may form the first character of a two-character given name. Concerning the second character following the family name, there is the additional condition that this character must not be a conjunctive term, a possessive indicator, or a verb that cannot form part of a name in Chinese.

If all of these conditions are met, the system 10 determines that there is a family name followed by a two-character given name. With the example sentence of Prime Minister Zhu Rongi, all of the conditions of Rule 4 are met. Hence, the system 10 determines that in the example sentence, Zhu is a family name followed by a two-character given name, Rongi.

In Rule 4, there is no requirement that the second character following the family name correspond to a character in the database 22 that can form the second character of a two-character given name. This tends to identify some special cases of two-character given names that the processing for the system 10 would not otherwise identify.

In contrast, Rule 5 imposes the condition that the second character following the family name correspond to a character in the database 22 that can form the second character of a two-character given name. This is the only condition imposed by Rule 5 with respect to the second character following the family name. Concerning the first character following the family name, Rule 5 imposes the condition that this character must not be a possessive indicator, or a conjunctive or prepositional term.

Rule 6 checks for the possibility that a one-character given name follows the noted family name. Hence, a condition of Rule 6 is that exactly one character must separate the noted family name from the word or words indicating status. For discussing Rule 6, FIG. 5A shows the example sentence "A secretary reports the business to the board chairman Wang Shi."

With this sentence, the system 10 would tag or note Wang as word that is used as a family name in China, and of the type that also has meaning when used as other than as a name in a sentence, such as when referring to the king of a country. The system would also note the status term "board chairman" as being of the type that may appear before or after the name of a person for which status is being indicated.

For this example, relative to the English translation, the words as actually used in Chinese are ordered differently. Specifically, the status term board chairman appears after the name Wang Shi in Chinese. However, at least one condition of each of Rules 4 and 5 is not met. Namely, there must be exactly two characters interposed between the family name and the status words. Here, there is only one character.

As all of the conditions are not met for either Rules 4 or 5 (and Rules 1–3 as well), the system 10 cannot yet distinguish based on the foregoing rules whether Wang Shi is a name. The system 10 next applies Rule 6. Rule 6 imposes the condition that a single character separate the noted family name from the status words. This condition is met. In particular, the word Shi is a single character interposed between the family name Wang and the status term board chairman.

Rule 6 additionally imposes the requirement or condition that the interposing character not be a possessive indicator, conjunctive term, or a verb of the type that cannot form part of a family name in Chinese. This is satisfied by the interposing character, which is the word Shi. Finally, Rule 6 further imposes the condition that there cannot be another family name immediately preceding the noted family name, Wang, in this example. This is also satisfied. If all the conditions of Rule 6 are satisfied, the system determines that there is a family name followed by a single-character given name.

For discussion of Rule 7, FIG. 5B shows the example sentence "Wang Anshi was a famous poet." Rules 7 imposes the condition that no status word or term be present. Rule 7 further requires that a family name be noted. The noted family name can be of either the type that has meaning only as a family name, or of the type that also has meaning when used as other than a name. These conditions are all met by the example sentence. Wang is a word in the database 22 noted or tagged as being in use as a family name in China. Moreover, there is no status term present in the sentence.

Rule 7 checks for the possibility that a two-character given name follows the noted family name. Therefore Rule 7 requires that the noted family name be followed by at least two characters. This condition is also met. The noted family name, Wang, is followed by a total of five characters prior to the example sentence being terminated by a period. Rule 7 requires that the first character following the noted family name correspond to a character in the database 22 that can form the first character of a two-character given name in China. In the example sentence, this condition is met. Finally, Rule 7 imposes the condition that the second character following the noted family name, must correspond to a character in the database 22 that can form the second character of a two-character given name. This condition is met.

If all of the conditions of Rule 7 are met, then the system 10 determines that a family name is followed by a two-character given name. Rule 7 imposes no conditions with respect to possessive indicators, conjunctive or possessive terms, adverbs, verbs, and so forth. The foregoing conditions requiring the first and second characters to correspond to characters in the database 22 is generally restrictive enough to avoid ambiguities.

For discussion of Rule 8, FIG. 5B shows the example phrase "The story of Lei Feng." Like Rule 7, Rules 8 requires that a family name be noted, and that no status term be present. As with Rule 7, the noted family name can be of either the type that has meaning only as a family name, or of the type that also has meaning when used as other than a name. These conditions are all met in the example phrase. Lei is a word listed in the database 22 that is used as a family name in China. Moreover, there is no status term or words in the sentence.

Rule 8 checks for the possibility that a one-character given name follows the noted family name. If all the conditions of Rule 8 are satisfied, the system 10 determines that there is a family name followed a by a single-character given name. Since Rule 8 is checking for the possibility of a single-character given name, Rule 8 requires that a possible family name be followed by at least one character. This condition is met in the example of "The story of Lei Feng." In Chinese, this phrase is written with the name appearing at the beginning, and a literal translation into English would be "Lei Feng's Story." So in Chinese, the family name Lei is actually followed by a total of five characters. Specifically, the character for Feng, a character corresponding to a possessive indicator, and two characters forming the word for story in Chinese.

Rule 8 further requires that the first character following the family name correspond to a character in the database 22 that can form the first character of a single-character given name in China. In the example phrase, this condition is met by the word Feng. However, there are many characters in the database 22 for characters that can form a single-character given name in Chinese and that also have meaning when not used as a name in another context. Hence, Rule 8 imposes additional conditions on what follows the possible single-character given name.

If the character immediately following the given name is a possessive indicator, aspect marker, conjunctive or prepositional term, or a verb that cannot form part of a name in Chinese, Rule 8 is satisfied. As discussed previously, these items typically do not form part of a name, and therefore can indicate the boundary of a name. In the example, Feng is followed by a possessive indicator. Therefore, Rule 8 is satisfied and the system 10 determines that a family name is followed by a single-character given name.

Alternatively, if there is a two-character word immediately following the given name, Rule 8 is also satisfied. In this regard, it is unlikely that a possible single-character given name would be immediately followed by a two-character word.

If all the conditions of Rule 9 are met, the system determines that a family name is followed by a two-character given name. For discussion of Rule 9, FIG. 5B shows the example sentence, "The song of Li Chunbo is very fair sounding." Rule 9, as with Rules 7 and 8, requires that a family name be noted, and that no status term be present. Rule 9 however, in contrast to Rules 7 and 8, impose the condition that the possible family name must be of the type that has meaning only as a family name. This condition is met by the word Li in the example. Specifically, Li is a word listed in the database 22 as used as a family name in China, and which has meaning only as a family name. Moreover, there is no identifiable status term in the sentence.

Rule 9 checks for whether a two-character given name follows the possible family name. Accordingly, Rule 9 requires that at least two characters follow the possible family name in the sentence, which is met in this example. Rule 9 further requires that the character immediately following the possible family name not be a possessive indicator, conjunctive or prepositional term, aspect marker, or a verb that cannot form part of a name in Chinese. Rule 9 further requires that the second character following the family name correspond to a character in the database 22 that can form the second character of a two-character given name in Chinese, and not be an adverb or a conjunctive term.

These conditions are all met in the example. Therefore the system 10 determines that Li is a family name and is followed by a two-character given name in the example sentence.

Rule 10, as with Rule 9, requires that a family name be noted, and that no status term be present in the phrase or sentence under consideration. Rule 10 imposes the same condition as in Rule 9 in that the possible family name must be of the type that has meaning only as a family name. Rule 10 also checks for the possibility that a family name is followed by a two-character given name. Accordingly, Rule 9 requires that at least two characters follow the possible family name in the sentence.

Rule 10 requires that the character immediately following the possible family name must correspond to a character in the database 22 that can form the first character of a two-character given name and not be a possessive indicator. Concerning the second character following the possible family name, Rule 10 requires that it not be an adverb, conjunctive or prepositional phrase, an aspect indicator, or a verb that cannot form part of a name in Chinese. If all the conditions of Rule 10 are met, the system determines that a family name is followed by a two-character given name.

Rule 11 requires the presence of a family name and the absence of a status term. In addition, the family name must be of the type that can also have meaning when used in another context. Further, the family name must be followed by at least two characters. The first character following the family name must not be a possessive or aspect indicator, a conjunctive or prepositional term, or a verb that cannot form part of a name in Chinese. The second character following the family name must correspond to a character in the database 22 that can form the second character of a two-character given name.

If all these conditions of Rule 11 are met, the system 10 concludes that there is possibly a family name followed by a two-character given name, which should be validated. For discussion in connection with Rule 11, FIG. 5B illustrates an example phrase stating: "Liang Shanbo and Zhu Yingtai." Here, "Zhu" has the same pronunciation as the "Zhu" discussed in connection with the example in FIG. 5A for Prime Minister Zhu Rongi, but using a different Chinese character. In the example using Zhu Yingtai, Zhu is a family name and can also be used as a verb that means to wish.

The name Zhu Yingtai meets all of the conditions of Rule 11. Specifically, Zhu is a family name of the type that can also have meaning when not used as a name. In addition, Yingtai is a two-character given name, the first character of which is not a possessive or aspect indicator, a conjunctive or prepositional term, or a verb that cannot form part of a name in Chinese. Hence, the system 10 would determine that Zhu Yingtai is possibly a family name followed by a two-character given name. The system 10 does not make a final determination based on Rule 11 because there is too much ambiguity. In particular, the family name can have meaning as other than as a name, and there is no status term as a further indicator as to whether a name is indeed meant in this context.

Rule 12, like Rule 11, requires the presence of a family name and the absence of a status term. In addition, the family name must be of the type that can also have meaning when used in another context as other than as a name. Further, the family name must be followed by at least two characters. Rule 12 requires that the first character following the family name must correspond to a character in the database 22 that can form the first character of a two-character given name, and it cannot be a possessive indicator. The second character following the family name must not be a possessive indicator, a prepositional term, punctuation, adverb, or a verb that cannot form part of a name in Chinese. If all these conditions of Rule 12 are met, the system 10 determines that there is possibly a family name followed by a two-character given name, which the system tags or notes for validation.

Rule 13, like Rules 11 and 12, requires the presence of a family name and the absence of a status term. In addition, the family name must be of the type that can also have meaning when used in another context. However, with Rule 13 the family name need only be followed by at least one character, unlike in Rules 11 and 12. Rule 13 requires that the character immediately following the family name must correspond to a character in the database 22 that can form the first character of a single-character given name, and it cannot be a possessive indicator, prepositional term, punctuation, or a verb that cannot form part of a name in Chinese.

If all the conditions of Rule 13 are met, the system 10 determines that there is possibly a family name followed by a single-character given name, which should be validated. For discussion in connection with Rule 13, FIG. 5B illustrates an example phrase stating: "Jiang Tao is very clever." As discussed before, Jiang is a family name, but can also mean river. There is thus a family name of the type that can also have meaning when not used as a name. In addition, there is no status term present in the example. Finally, the family name is followed by at least one character, in this case, the character for Tao. Moreover, Tao is not a possessive indicator, prepositional term, punctuation, or a verb that cannot form part of a name in Chinese. Therefore, the system 10 determines there is possibly a family name followed by a single-character given name, which the system tags or notes for validation.

Rule 14 requires the presence of a family name and the absence of a status term. In addition, the family name must be of the type that can also have meaning when used in another context. Rule 14 further requires that a character immediately follow the family name, and that this character must not be a possessive indicator, prepositional or conjunctive term, aspect marker, or a verb that cannot form part of a name in Chinese. In addition, there must be a second character following the family name that is a conjunctive or prepositional term or a verb that cannot form part of a name in Chinese.

If all the conditions of Rule 14 are met, the system determines possibly there is a family name followed by a single-character given name, which should be validated. For discussion in connection with Rule 14, FIG. 5B illustrates an example sentence stating: "Hu Sheng is a famous author." In the sentence, Hu is a family name, but it can also be used as an adjective to mean foreign. There is thus a family name of the type that can also have meaning when not used as a name. In addition, there is no status term present in this example sentence. Finally, the family name is followed by at least one character, in this case, the character for Sheng. Moreover, Sheng is not a possessive indicator, prepositional term, punctuation, or a verb that cannot form part of a name in Chinese. Therefore, the system 10 determines based on Rule 14 that there is possibly a family name followed by a single-character given name, which the system tags or notes for validation.

Rules 11 and 12 can both result in noting a possible family name followed by a two-character given name. Rules 13 and 14 can both result in a noting a possible family name followed by a single-character given name. In these situations, the system attempts to validate whether or not a person's name is indeed being used in the sentence or phrase that is under consideration.

If the text is formed of several sentences, usually a person's name will appear more than once. In one of the sentences, the system 10 may have been able to affirm based on one of the rules that the person's name was indeed being used as a name. For example, the person's name may have been used in a sentence having a status term. If there is another instance where the system 10 determined that a person's name is only possibly used, i.e., per one of Rules 11–14, the system will compare the possibly noted name to see if there are other occurrences of the name where the system affirmed that the identical name in question was indeed being used as a name, i.e., per one of Rules 1–10. If so, the system 10 determines the possibly noted names to be validated and affirms that the name in question is indeed being used as a name in these other instances.

The database 22 as described herein is intended to include a dictionary or lexicon provided with part-of-speech tagging software. In particular, the system 10 preferably relies to the extent possible upon tagging performed in accordance with presently available part-of-speech tagging software. Hence, the software for the system 10 can rely upon these tags for identifying ordinary parts-of-speech, for example, such as prepositional and conjunctive terms, possessive indicators, aspect markers, adverbs, and etc. For other parts of speech that the part-of-speech tagging software does not recognize or does not recognize accurately, such as names of persons, or terms indicating status, and etc., the database 22 includes additional information as described above.

For example, the additional information includes family names and the type, i.e., whether it is the type that only has meaning as a name or whether it also has meaning when not used as a name; the characters for given names; status terms and the type, i.e., whether the status term may only appear before the name for which status is being indicated, or before and after; whether it is a verb that cannot form part of name in Chinese; and etc. The additional information may be added to the dictionary or lexicon for the part-of-speech tagging software by tagging such words therein, or another database formed and combined with the dictionary such that the database 22 includes a plurality of sub-databases or is integrated to form one large database.

Modifications, substitutions or other alterations could be made. For example, the database 22 could be modified to list complete two-character given names, rather than characters that can form the first name of a two-character given name, and the second character of a two-character given name. In addition, there is no rule specifically adapted for directly identifying the few special cases of two-character Chinese family names. A rule could also be added for this purpose and/or the data/database 22 expanded to include two-character Chinese family names.

Some of the rules apply even if the family name identified in the sentence is of the type that has meaning in modern Chinese only as a family name. Such rules could be modified to apply only to family names that have meaning both as a name and in contexts other than a name, because there is little ambiguity with family names that have meaning only as name. Together with this, another rule could be added that requires identification of a family name that has meaning only when used as a name. Further, application of the rules could be reordered for particular circumstances. In view of the alterations, substitutions and modifications that could be made by one of ordinary skill in the art, it is intended that the scope of letters patent granted hereon be limited only by the definitions of the appended claims.

Figure 8:
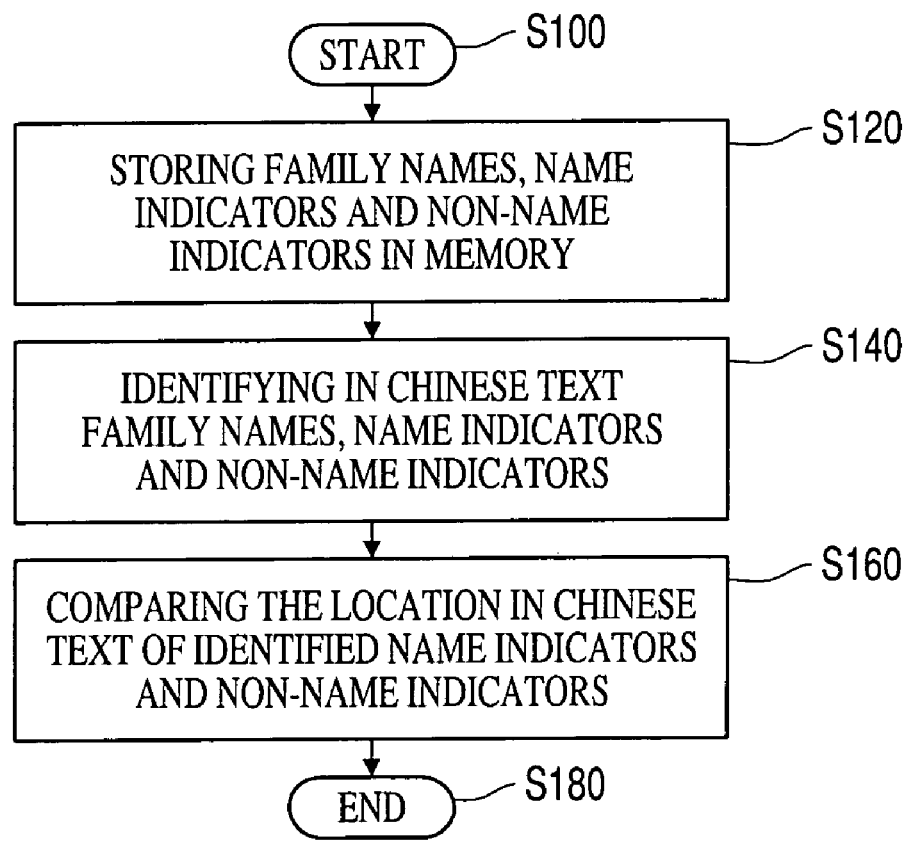
FIG. 8 illustrates an exemplary process for distinguishing names of persons in Chinese text.

FIG. 8 illustrates an exemplary process for distinguishing names of persons in Chinese text. In FIG. 8, the process starts in step S100 and continues to step S120, during which data is stored in memory, and the data may correspond to family names and given names that are currently in use in Chinese, name indicators used in Chinese text that indicate the probable presence of a name, or non-name indicators that indicate that a word cannot be a name. Next, control continues to step S140, during which Chinese text is identified based on the stored data, family names, name indicators and non-name indicators. Next, control continues to step S160, during which the location in the Chinese text of identified name indicators and non-name indicators is compared relatively to identified names in the text, and if predefined conditions are met, an affirmation is made that an identified name is being used as a name in the text. Next, control continues to step S180, where the process ends.

The embodiments of the invention in which an exclusive property or privilege is claimed are defined as follows:

1. A system for distinguishing names of persons in Chinese text, the system comprising:
    (a) a computer for receiving Chinese text in electronic format, the computer including at least an input, an output for outputting results, a processor for processing instructions and data; and a memory and storage arrangement for storing instructions and data;
    (b) data accessible by the processor, the data stored in memory and including at least family names and given names presently being used in Chinese, and name indicators used in Chinese text that indicate probable presence of a name and may either precede or follow the probable presence of the name, and non-name indicators that indicate a word cannot be a name; and
    (c) software installed on the computer, the software when performed by the computer causing the processor to perform processing including:
        (i) identifying names in Chinese text that has been input to the computer for names corresponding to the family and given names presently being used in Chinese and included in the stored data;
        (ii) identifying name indicators and non-name indicators in the inputted Chinese text corresponding to the data;
        (iii) comparing the location in the Chinese text of identified name indicators and non-name indicators relative to identified names in the text, and if predefined conditions are met, affirming that an identified name is being used as a name in the text; and
        (iv) outputting results.

2. The system of claim 1, wherein the data comprises family names of at least two types, a first type being a family name that has meaning only when used as a name, and a second type being a family name that also has meaning when used in a context as other than as a name, and the data indicates the type for each family name, and if a name-indicator is not present in the text corresponding to an identified name of the second type, and if predefined conditions are met, the processing notes this identified name as requiring validation before the name can be affirmed as being used as a name in the text.

3. The system of claim 1, wherein the predefined conditions include a plurality of rules applied in sequential order.

4. The system of claim 1, wherein the predefined conditions require a determination that a family name is immediately followed in the text by a given name.

5. The system of claim 1, wherein the data comprises name indicators of at least two types, a first type wherein the name must precede the probable presence of a name in text for which the name indicator is indicating the probable presence thereof, and a second type for which the name indicator may either precede or follow the probable presence of a name in text for which the name indicator indicates the probable presence thereof, and the data indicates the type for each name indicator, and said predefined conditions take into account the location of an identified name relative to the type of an identified name-indicator.

6. The system of claim 1, wherein the name indicators comprise terms that signify status of a person.

7. The system of claim 1, wherein the data includes single-character given names, the first character of two-character given names, and the second character of two-character given names.

8. The system of claim 1, wherein the non-name indicators comprise at least one conjunctive, prepositional term, verb or adverb.

9. A process for distinguishing names of persons in Chinese text, the process comprising:
  (a) storing in memory data corresponding to:
    (i) family names and given names currently in use in Chinese;
    (ii) name indicators used in Chinese text that indicate the probable presence of a name and that may either precede or follow the probable presence of the name; and
    (iii) non-name indicators that indicate a word cannot be a name;
  (b) identifying in Chinese text based on the stored data, family names, name indicators and non-name indicators; and
  (c) comparing the location in the Chinese text of identified name indicators and non-name indicators relative to identified names in the text, and if predefined conditions are met, affirming that that an identified name is being used as a name in the text.

10. The process of claim 9, wherein the name indicators include at least two types, a first type wherein the name must precede the probable presence of a name in text for which the name indicator is indicating the probable presence thereof, and a second type for which the name indicator may either precede or follow the probable presence of a name in text for which the name indicator indicates the probable presence thereof, and said establishing data includes indicating the type for each name indicator, and the predefined conditions in said comparing takes into account the location of an identified name relative to the type of an identified name-indicator.

11. The process of claim 9, wherein the predefined conditions require a determination that a family name is immediately followed in the text by a given name.

12. The process of claim 11, wherein the data corresponding to given names includes single-character given names, the first character of two-character given names, and the second character of two-character given names.

13. The process of claim 9, wherein family names comprise at least two types, a first type being a family name that has meaning only when used as a name, and a second type being a family name that also has meaning when used in a context as other than as a name, and said establishing and said establishing data includes indicating the type for each family name.

14. The process of claim 13, wherein if a family name of the second type is identified and there is no corresponding identified name indicator, if predefined conditions are met, said comparing does not affirm the identified name as being used in the text, and notes that the identified name as requiring validation before the name can be affirmed as being used as a name in the text.

15. The process of claim 9, where the name indicators comprise terms that signify status of a person.

16. The process of claim 9, wherein the non-name indicators comprise at least one conjunctive, prepositional term, verb or adverb.

17. A product for distinguishing names in Chinese text using a computer, the product comprising a recording medium having computer readable data and program logic stored thereon, the computer data including:
  (a) family names and given names currently in use in Chinese;
  (b) name indicators used in Chinese text that indicate the probable presence of a name and that may either precede or follow the probable presence of the name; and
  (c) non-name indicators that indicate a word cannot be a name; and
  the program logic when executed by a computer, causing the computer to perform processing including:
    (a) identifying names in Chinese text that has been input to the computer for names corresponding to the stored family and given names presently being used in Chinese;
    (b) identifying name indicators and non-name indicators in the inputted Chinese text corresponding to the data;
    (c) comparing the location in the Chinese text of identified name indicators and non-name indicators relative to identified names in the text, and if predefined conditions are met, affirming that that an identified name is being used as a name in the text; and
    (d) outputting results.

18. The product of claim 17, wherein the data comprises family names of at least two types, a first type being a family name that has meaning only when used as a name, and a second type being a family name that also has meaning when used in a context as other than as a name, and the data indicates the type for each family name; and if a name-indicator is not present in the text corresponding to an identified name of the second type, and if predefined conditions are met, the processing notes this identified name as requiring validation before the name can be affirmed as being used as a name in the text.

19. The product of claim 17, wherein the predefined conditions require a determination that a family name is immediately followed in the text by a given name.

20. The product of claim 17, wherein the data comprises name indicators of at least two types, a first type wherein the name must precede the probable presence of a name in text for which the name indicator is indicating the probable presence thereof, and a second type for which the name indicator may either precede or follow the probable presence of a name in text for which the name indicator indicates the probable presence thereof, and the data indicates the type for each name indicators, and said predefined conditions take into account the location of an identified name relative to the type of an identified name-indicator.

21. The product of claim 17, wherein the name indicators comprise terms that signify status of a person.

22. The product of claim 17, wherein the data includes single-character given names, the first character of two-character given names, and the second character of two-character given names.

23. The product of claim 17, wherein the non-name indicators comprise at least one conjunctive, prepositional term, verb or adverb.

24. A system for distinguishing a name in Chinese text, the system comprising:

a computer that receives Chinese text, the computer having a database and software;

the database storing data, the data including one or more names used in Chinese, name indicators that indicate probable presence of a name and that may either precede or follow the probable presence of the name, and non-name indicators that indicate a word cannot be a name, the non-name indicators being classified by grammatical description;

the software including:

identifying names, name indicators and non-name indicators in the received Chinese text based on the data stored in the database;

comparing a relation between the identified name indicator and the identified non-name indicator in the received Chinese text, and if a predetermined condition is met in the relation, affirming that the identified name is being used as a name in the text.

25. The system of claim 24, wherein the non-name indicators comprise at least one conjunctive, prepositional term, verb or adverb.

* * * * *